(12) United States Patent
Ramirez

(10) Patent No.: US 7,761,249 B2
(45) Date of Patent: Jul. 20, 2010

(54) UTILITY METER HAVING RF PROTECTION

(75) Inventor: Anibal Diego Ramirez, Indianapolis, IN (US)

(73) Assignee: Landis+Gyr, Inc., Lafayette, IN (US)

( * ) Notice: Subject to any disclaimer, the term of this patent is extended or adjusted under 35 U.S.C. 154(b) by 376 days.

(21) Appl. No.: 11/334,130

(22) Filed: Jan. 17, 2006

(65) Prior Publication Data

US 2006/0158348 A1    Jul. 20, 2006

Related U.S. Application Data

(60) Provisional application No. 60/644,634, filed on Jan. 14, 2005.

(51) Int. Cl.
*G01R 25/00* (2006.01)
(52) U.S. Cl. ........................................ 702/65
(58) Field of Classification Search .................... 702/65
See application file for complete search history.

(56) References Cited

U.S. PATENT DOCUMENTS

| | | | | |
|---|---|---|---|---|
| 4,055,804 | A | * | 10/1977 | Mayfield ..................... 324/142 |
| 4,587,588 | A | * | 5/1986 | Goldstein ..................... 361/54 |
| 5,072,200 | A | * | 12/1991 | Ranky ......................... 333/167 |
| 5,590,179 | A | | 12/1996 | Shincovich et al. |
| 5,933,004 | A | | 8/1999 | Jackson et al. |
| 5,999,398 | A | * | 12/1999 | Makl et al. ................... 361/302 |
| 6,078,785 | A | * | 6/2000 | Bush ............................. 455/7 |
| 6,121,158 | A | | 9/2000 | Benchikha et al. |
| 6,181,294 | B1 | | 1/2001 | Porter et al. |
| 6,226,600 | B1 | * | 5/2001 | Rodenberg et al. ............ 702/61 |
| 6,262,672 | B1 | | 7/2001 | Brooksby et al. |
| 6,324,047 | B1 | * | 11/2001 | Hayworth ..................... 361/302 |
| 6,374,188 | B1 | | 4/2002 | Hubbard et al. |
| 6,553,353 | B1 | * | 4/2003 | Littlejohn .................... 705/412 |
| 6,555,997 | B1 | * | 4/2003 | De Vries et al. ............... 324/74 |
| 6,564,159 | B1 | | 5/2003 | Lavoie et al. |
| 6,734,661 | B2 | | 5/2004 | Colby et al. |
| 6,816,360 | B2 | | 11/2004 | Brooksby et al. |
| 2004/0125889 | A1 | * | 7/2004 | Cumeralto et al. ........... 375/303 |
| 2004/0218688 | A1 | * | 11/2004 | Santhoff et al. .............. 375/295 |
| 2004/0227622 | A1 | * | 11/2004 | Giannini et al. ........ 340/310.01 |
| 2004/0263352 | A1 | * | 12/2004 | Cornwall et al. ........ 340/870.02 |
| 2005/0055586 | A1 | * | 3/2005 | Flen et al. .................... 713/300 |
| 2006/0044851 | A1 | * | 3/2006 | Lancaster et al. .............. 363/53 |

* cited by examiner

*Primary Examiner*—Aditya Bhat
(74) *Attorney, Agent, or Firm*—Maginot, Moore & Beck

(57) ABSTRACT

An arrangement for use in a utility meter includes a first filter stage and a second filter stage. The utility meter has a measurement circuit that includes at least one analog portion susceptible to radio frequency signal interference, the radio frequency signal interference forming an extraneous signal component in an analog signal that is representative of a signal to be measured. The first filter stage is operable to attenuate signals in a first frequency range that is higher than a frequency band of interest of the signal to be measured. The first filter stage is operably coupled to receive the analog signal. The second filter stage is operable to attenuate signals in a second frequency range that is higher than the first frequency range. The second filter stage is also operably coupled to receive the analog signal.

7 Claims, 4 Drawing Sheets

UTILITY METER HAVING RF PROTECTION

This application claims the benefit of U.S. Provisional Patent Application Ser. No. 60/644,634, which was filed on Jan. 14, 2005, and which is incorporated herein by reference.

FIELD OF THE INVENTION

The present invention relates generally to utility meters, and more particularly to utility meters that are potentially exposed to RF signals that can interfere with measurement accuracy.

BACKGROUND OF THE INVENTION

Utility meters are devices that, among other things, measure the consumption of a utility generated commodity, such as electric energy, gas, or water, by a residence, factory, commercial establishment or other such facility. Utility service providers employ utility meters to track customer usage of utility generated commodities. Utilities track customer usage for many purposes, including billing and tracking demand for the relevant consumed commodity.

Increasingly, meters employ electronic circuits to both reduce the number of moving parts in the meters and to provide enhanced metering and data collection services. The use of electronic circuits is most prevalent in utility meters that measure electricity consumption, also known as electricity meters. However, electronic circuits may be implemented in gas or water meters as well.

In addition, meters have increasingly employed communication circuits to facilitate remote meter reading. Specifically, a utility meter is typically installed at or near the facility or residence of each customer. Service providers historically have used field technicians or "meter-readers" to obtain usage data from the remotely located utility meters. Manual meter reading, however, imposes significant labor costs and is vulnerable to transportation problems and human error. Consequently, utility meters have been increasingly outfitted with communication circuits to facilitate remote meter reading.

The inclusion of communication circuits can have negative consequences, particularly in electronic meters. One issue that is always present is the need for accuracy in meters. Industry and/or government standards require metering accuracy as a protection to the consumer, among other things. Communication circuits can reduce the accuracy of meter measurements, particularly when using electronic measurement circuits.

For example, meter communication circuits can sometimes employ high frequency fixed and spread spectrum wireless devices that operate in the frequency range of on the order of 100 MHz to 1 GHz. Such high frequency signals may radiate back onto analog measurement lines within the meter, introducing a high frequency signal on the power line signal to be measured. This induced high frequency signal can reduce meter accuracy.

A further issue related to meters having communication circuit arises from the fact that the same meter platform may be coupled with any of a plurality of compatible communication devices. In particular, it is desirable that meters may ideally be coupled with different communication circuits so that they may be made compatible with the various types of communication networks employed by utilities. Because of the interchangeability of communication circuits, any attempt to overcome the difficulties posed by one communication scheme may introduce unnecessary cost and/or possibly new difficulties with respect to other communication schemes.

There is a need, therefore, for an arrangement that reduces the probability of metering inaccuracies due to spurious signals caused by communication circuits in or around metering devices.

SUMMARY OF THE INVENTION

The present invention addresses the above need, as well as others, by providing filtering arrangements in the signal line of measurement circuits that remove high frequency signals. In one embodiment, the filtering arrangement includes a multilayer varistor feedthrough device that attenuates RF signals in the wireless range while passing the lower frequency power line signals. In another embodiment, the filtering arrangement includes a first low pass analog filter for one frequency band, and another low pass analog filter for another frequency band. The reason for two low pass filters is that different filter components behave differently at frequency extremes.

Some embodiments of the invention allow for relatively inexpensive high frequency suppression that is compatible with various types of communication devices. Some embodiments permit the use high frequency spread spectrum devices without undue measurement inaccuracy caused by the impression of the high frequency signals on the line being measured. Still other embodiments provide both of the aforementioned advantages, at least to some degree.

The above described features and advantages, as well as others, will become more readily apparent to those of ordinary skill in the art by reference to the following detailed description and accompanying drawings.

DETAILED DESCRIPTION

Figure 1:
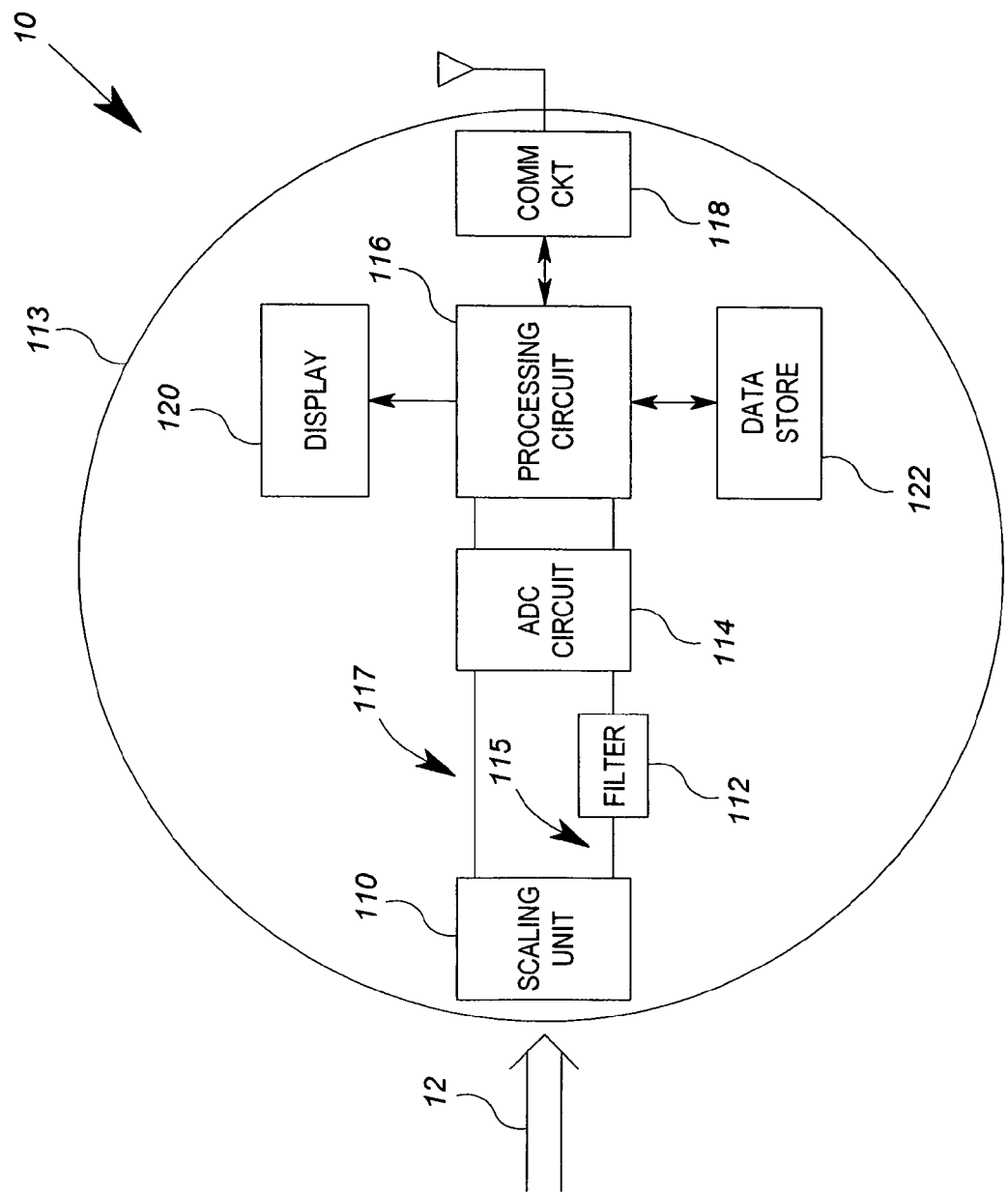
FIG. 1 shows a schematic block diagram of an exemplary meter incorporating at least some embodiments of the invention.

FIG. 1 shows in a metering unit 10 that incorporates at least some embodiments of the present invention. In these embodiments, the metering unit 10 is an electricity meter. However, those of ordinary skill in the art may readily incorporate the features described herein to other types of commodity consumption meters, so long as those meters employ electronic measurement circuit and have analog components on which RF signals may be radiated.

Referring to FIG. 1 specifically, the metering unit 10 is an apparatus for measuring energy consumption that includes a scaling circuit 110, a filter circuit 112, an analog to digital conversion ("ADC") circuit 114, a processing circuit 116, a communication circuit 118, an optional display 120 and a data store 122. All of the above listed elements are preferably supported by a meter housing 113, which may take a plurality of known forms. The communication circuit 118 may be disposed within an interior of the meter housing 113 like the other devices, or may be affixed to the outside of the meter housing 113.

In the embodiment described herein, the scaling circuit 110, the filter circuit 112 and the ADC circuit 114 are arranged to generate a first digital signal representative of a line voltage waveform and a second digital signal representative of a line current waveform. The processing circuit 116 is operable to calculate one or more energy consumption values based on the first and second digital signals. The energy consumption values may be communicated to a remote device using the communication circuit 118, displayed using the display 120, stored in the data store 122, or preferably some combination of the foregoing.

In particular, the scaling circuit 110 may suitably comprise current and voltage sensors, not shown. The voltage sensors, which may, for example, include voltage dividers, generate a scaled down version of the voltage present on the power lines 12. The current sensors, which may suitably include current transformers, shunts, embedded coil devices and the like, generate a voltage or current signal that is a scaled down version of the current present on the power lines. Various voltage and current sensors are known in the art.

The filter circuit 112 preferably includes at least a band pass or low pass filter operable to attenuate or substantially filter out high frequency noise found in signals received from the scaling circuit 110. In the embodiment described herein, the filter circuit 112 is disposed in the circuit path 115 between the scaling circuit 110 and the ADC circuit 114 that carries the current measurement signal. The current measurement signal is most susceptible to RF noise for a number of reasons, including the fact that the current measurement signal varies dependent on power usage, and therefore can be relatively small at times. However, it will be appreciated that elements of embodiments of the filter circuit 112 may be used in the voltage circuit path 117 between the scaling circuit 110 and the ADC circuit 114 if desired.

The filter circuit 112 includes on or more elements capable of filtering high frequency signals in the band used by wireless devices including, but not limited to, spread spectrum wireless devices. In one embodiment, the filter circuit 112 includes two filter stages or subcircuits, a first filter configured to attenuate kHz to low MHz noise or signals, and a second filter configured to attenuate on the order of 100 MHz to 1 GHz or higher signals. In general, filter components that attenuate kHz to low MHz signals tend to be less effective at attenuating 100 MHz to 1 GHz or higher signals, and filter components that attenuate kHz to low MHz signals tend to be less effective at filtering kHz range signals.

In other embodiments, the filter circuit 112 includes a multilayer varistor feedthrough device that is designed to attenuate signals at frequencies roughly at least as high as 100 MHz, and preferably 1 GHz. One such device is a TransFeed brand MLVF available from AVX Corporation, a Kyocera Group Company, having contact information at www.avxcorp.com. A suitable example is the product number VC080514C300 TransFeed MLVF from AVIX Corporation. That device has sufficient attenuation range in at least the 100 MHz to 1 GHz band.

The ADC circuit 114 includes one or more analog-to-digital converters that convert the scaled (and filtered) measurement signals into digital voltage and current measurement signals. Many circuits capable of generating digital voltage and circuit waveform signals are well known in the art. Suitable examples of analog to digital conversion circuits having such capabilities are described in U.S. Pat. No. 6,374,188; U.S. Pat. No. 6,564,159; U.S. Pat. No. 6,121,158 and U.S. Pat. No. 5,933,004, all of which are incorporated herein by reference.

The processing circuit 116 is a device that employs one or more processing devices such as microprocessors, microcontrollers, digital signal processors, discrete digital circuits and/or combinations thereof. The processing circuit 116 is operable to generate energy consumption data based on the first digital signal and the second digital signal. For example, the processing circuit 116 may generate watt-hours, VAR-hrs, power factor, root-mean-square voltage and/or current, or combinations of any of the foregoing. Various processing circuits operable to generate energy consumption data from digital voltage and digital current measurement signals are well known in the art. Suitable examples of such circuits are described in U.S. Pat. No. 6,374,188; U.S. Pat. No. 6,564,159; U.S. Pat. No. 6,121,158 and U.S. Pat. No. 5,933,004.

The processing circuit 116 is further operable to store the plurality of energy consumption values in the data store 122. In some embodiments, the processing circuit 116 may store energy consumption values for each of plurality of time periods, in order to allow analysis of energy usage at different times of day, days of the week or month, or even seasonally. The storage of consumption indexed to time periods is often referred to in the industry as "load profiling". The data store 122 may suitably be a random access memory, EEPROM, other memory, or a combination of several types. In still other embodiments, the data store 122 may be circular buffer, FIFO device, or other memory that stores data in the order in which it is received. Other known methods may be used.

The communication circuit 118 is a device operable to communicate data between the metering unit 12 and one or more remote devices. In a system such as that shown in FIG. 1, the communication circuit 118 would be operable to communicate directly or indirectly with a data collection system of a utility service provider. Several of such systems are known. The utility service provider then uses the collected data to generate billing information and/or data forecasting information as is known in the art. To this end, the communication circuit 118 may suitably include a radio, a telephone modem, a power line carrier modem, or other known communication device configured for use with utility meters. Radios may be used that operation in the 100 MHz to 1 GHz range. However, other devices may operate in the kHz or low MHZ range. All of such devices are capable or radiating signals onto signals lines such that the measurement signals generated by the scaling circuit 110 includes some of the radiated signals.

The meter display 120, which is optional, may be a digital display such as a liquid crystal display. It will be appreciated that the exact nature of the display is not particularly important to the implementation of the invention. Nevertheless, there is an advantage of including at least some display capabilities. LCD displays, moreover, have been found to have a particularly advantageous set of qualities for use in electronic meters.

In operation, the processing circuit 116 generates energy consumption data representative of energy being consumed by a load. To this end, the metering unit 10, and specifically the scaling circuit 112, is connected to measure power flowing through power lines 12. The scaling circuit 112 generates a voltage measurement signal as an output on the voltage circuit path 117 and generates a current measurement signal as an output on the current circuit path 115. The voltage measurement signal is an analog signal that has a waveform that is representative of the voltage waveform in the power lines 12. The current measurement signal is an analog signal that has a waveform that is representative of the current waveform in the power lines 12.

It will be appreciated that the scaling circuit 112 need not be connected to the power lines 12 directly, but may instead be connected to the power lines through additional transformers, not shown, but which are external to the meter unit 12.

Meters that connect to the power lines via external transformers are commonly known as transformer-rated meters.

In any event, the filter circuit 112 filters the analog current measurement signal to attenuate, and preferably substantially remove, any high frequency components. The high frequency components often include RF signals that are imposed on the measurement signals, and therefore do not represent actual power being consumed by the load (e.g. the customer). Those high frequency components can create inaccuracies in the energy consumption calculations generated by the processing circuit 116. The filter circuit 112 provides the filtered current measurement signal to the ADC circuit 114. The ADC circuit 114 also receives the analog voltage measurement signal from the voltage circuit path 117.

The ADC circuit 114 generates a digital voltage signal, which preferably is a series of digital samples that represent a scaled version of the voltage waveform(s) on the one or more of the power lines 12. The ADC circuit 114 also generates a digital current signal, which preferably is a series of digital samples that represent a scaled version of the current waveform(s) on the one or more of the power lines 12.

The processing circuit 116 receives the digital voltage and current signals and generates energy consumption data, for example, data representative of kilowatt-hours or the like. The processing circuit 116 optionally provides information representative of at least some of the energy consumption data to the display 120. The processing circuit 116 may also store some of the energy consumption data in the data store 122.

The processing circuit 116 generates the energy consumption data using known techniques. For example, one method of generate energy consumption data is to multiply each voltage sample with each concurrent current sample generated by the ADC circuit 114. The resulting products are added to form an accumulated energy consumption value. In polyphase meters, concurrent voltage and current samples from each phase are multiplied together on a phase-wise basis. Such methods are known in the art.

From time to time, the communication circuit 118 communicates at least some energy consumption information to a remote device, not shown. The remote device may suitably be a radio network device, satellite pager network device, data concentrator or the like. The communication circuit 118 may obtain the energy consumption information directly from the processing circuit 116, or directly or indirectly from the data store 122. The communication circuit 118 then transmits the obtained information to the remote device. The use of the communication circuit 118 in this manner can eliminate or at least reduce the need for meter readers that physically read the meter display 120.

In accordance with aspects of embodiments of the invention, the energy consumption data generated by the processing circuit 116 has reduced error due to RF transmissions because of the filter circuit 114. The filter circuit 114 is relatively cost effective implement, and is readily incorporated into the analog circuit of the meter. It will be appreciated that the filter circuit 114 can remove spurious RF signals from other sources, not just those arising from the communication circuit 118.

Figure 2:
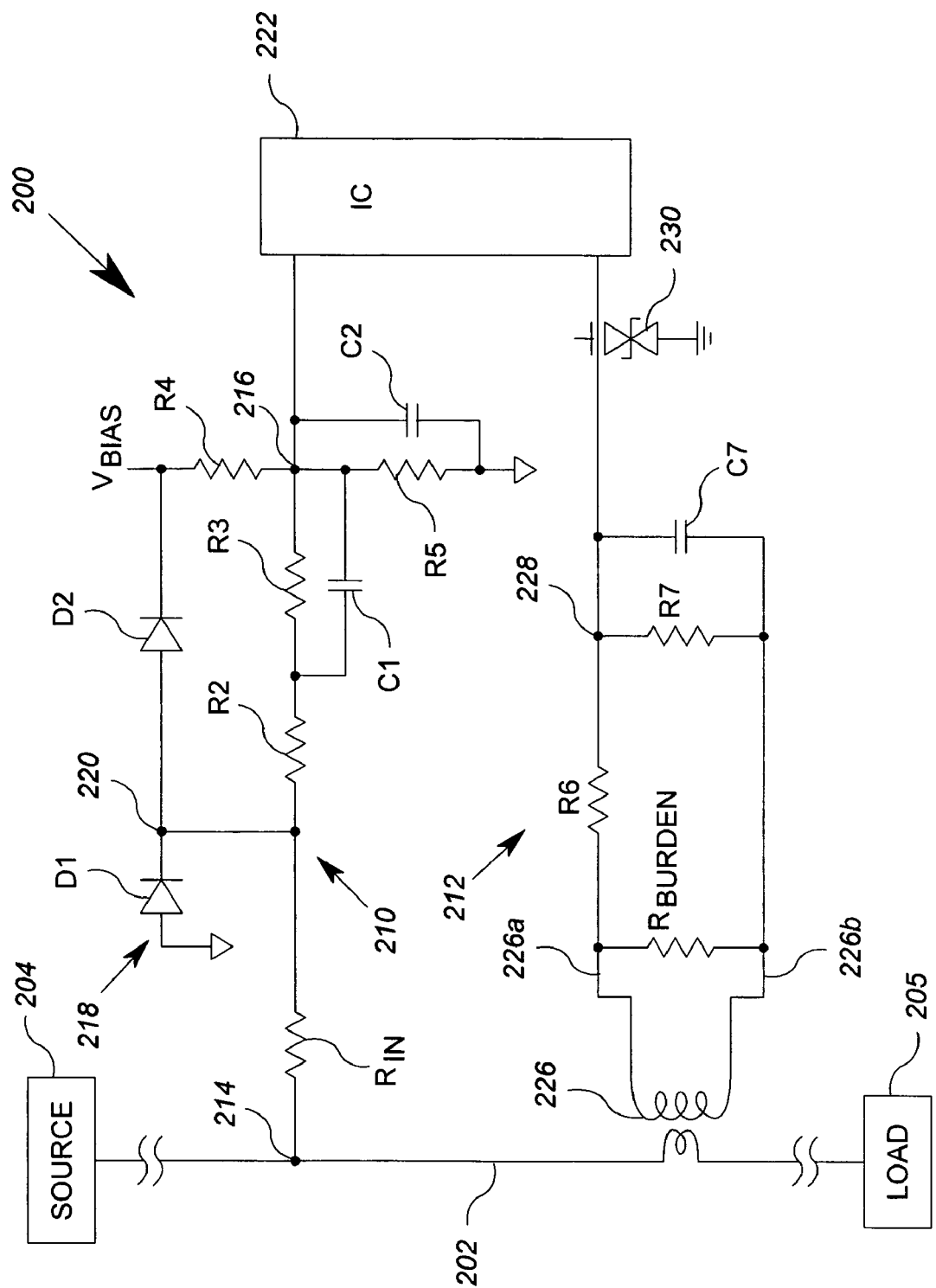
FIG. 2 shows in further detail a schematic block diagram of an exemplary arrangement that incorporates aspects of the invention.

FIG. 2 shows in further detail an arrangement 200 that may be used as the scaling circuit 110, filter circuit 112, ADC circuit 114 and at least part of the processing circuit of FIG. 1. The arrangement 200 is operable to generate energy consumption data for a single phase of a power line 202. The power line is connected between a power source 204 (such as a utility) and a load (such as a customer). For loads that have multiphase power, for example, three-phase power, a similar arrangement may be used for each phase of the multiphase power lines.

In any event, the arrangement 200 includes an analog voltage circuit 210 and an analog current circuit 212. The analog voltage circuit 210 includes a connection 214 to the power line 202. An input resistor RIN is series connected between the connection 214 and a voltage divider junction 216. A first resistor R4 is connected between a bias voltage VB and the voltage divider junction 216, while a second resistor R5 is connected between the voltage divider junction 216 and ground. In the embodiment described herein, additional resistors R2 and R3, which have a much smaller resistance than RIN, are series connected between RIN and the voltage divider junction 216. A capacitor C1 is coupled parallel to the resistor R3 between the resistor R2 and the voltage divider junction 216.

The analog voltage circuit 210 further includes a voltage surge suppression circuit 218 that operates to protect the downstream circuit from large voltage surges. The voltage surge suppression circuit 218 has junction point 220 coupled between the series connected resistors RIN and R2. A reverse biased diode D1 is coupled from the junction point 220 to ground, while a forward biased diode D2 is coupled from the junction point 220 to the positive bias voltage. The diode D1 ensures that the voltage in the signal path through RIN, R2 and R3 does not become greatly negative, and the diode D2 ensure that the voltage in the signal path through RIN, R2 and R3 does not get too high.

The analog voltage circuit 210 includes yet another capacitor C2 coupled across the resistor R5 from the voltage divider junction 216 and ground. The voltage divider junction 216 is coupled to an integrated circuit 222 having an ADC circuit and a digital signal processing circuit. The ADC circuit and digital processing circuit may suitably be configured as the ADC circuit 114 and at least a portion of the processing circuit 116 of FIG. 1, described above. The voltage divider junction 216 is operable to provide the scaled analog voltage measurement signal to the ADC circuit of the integrated circuit 222. It will be appreciated that the ADC circuit need not be integrated with the digital processing circuit into a single integrated circuit 222.

Suitable values for the various element described above are set forth below in Table 1. It will be apparent to those of ordinary skill in the art how to adjust various elements to modify the output levels and behavior of the analog voltage circuit 210.

TABLE 1

| Device | Value |
|---|---|
| RIN | 1 M-ohm |
| R2 | 1 k-ohm |
| R3 | 2.49 k-ohms |
| C1 | 0.47 μF |
| C2 | 330 pF |
| R4, R5 | 10 k-ohms |

The analog current circuit 212 includes a current transformer 226 disposed in a current sensing relationship with the power line 202. To this end, the current transformer 226 may suitably be an N turn toroid through which a conductor of the power line 202 passes. The current transformer 226 is operably coupled to a burden resistor RBURDEN, which is operable to convert the sensed current from the power line to a voltage signal. The resistor RBURDEN is coupled across first and second lines 226a, 226b of the current transformer. The second line 226b is tied to ground. A resistor R6 is coupled between first line 226a and a junction 228. A resistor R7 is coupled between the junction 228 and ground, as is a capacitor C7. The capacitor C7 and the resistors R6 and R7 act as a filter that pass low frequencies, such as power line signal frequencies, and attenuate higher frequencies, such as RF frequencies. The capacitor C7, however, is a traditional capacitive component which at some high frequency threshold does not behave in a linear or ideal capacitor manner. Accordingly, at some higher frequencies, including those in the several hundred megahertz range, the filter formed by the elements C7, R6 and R7 does not operate as effectively.

Figure 3:
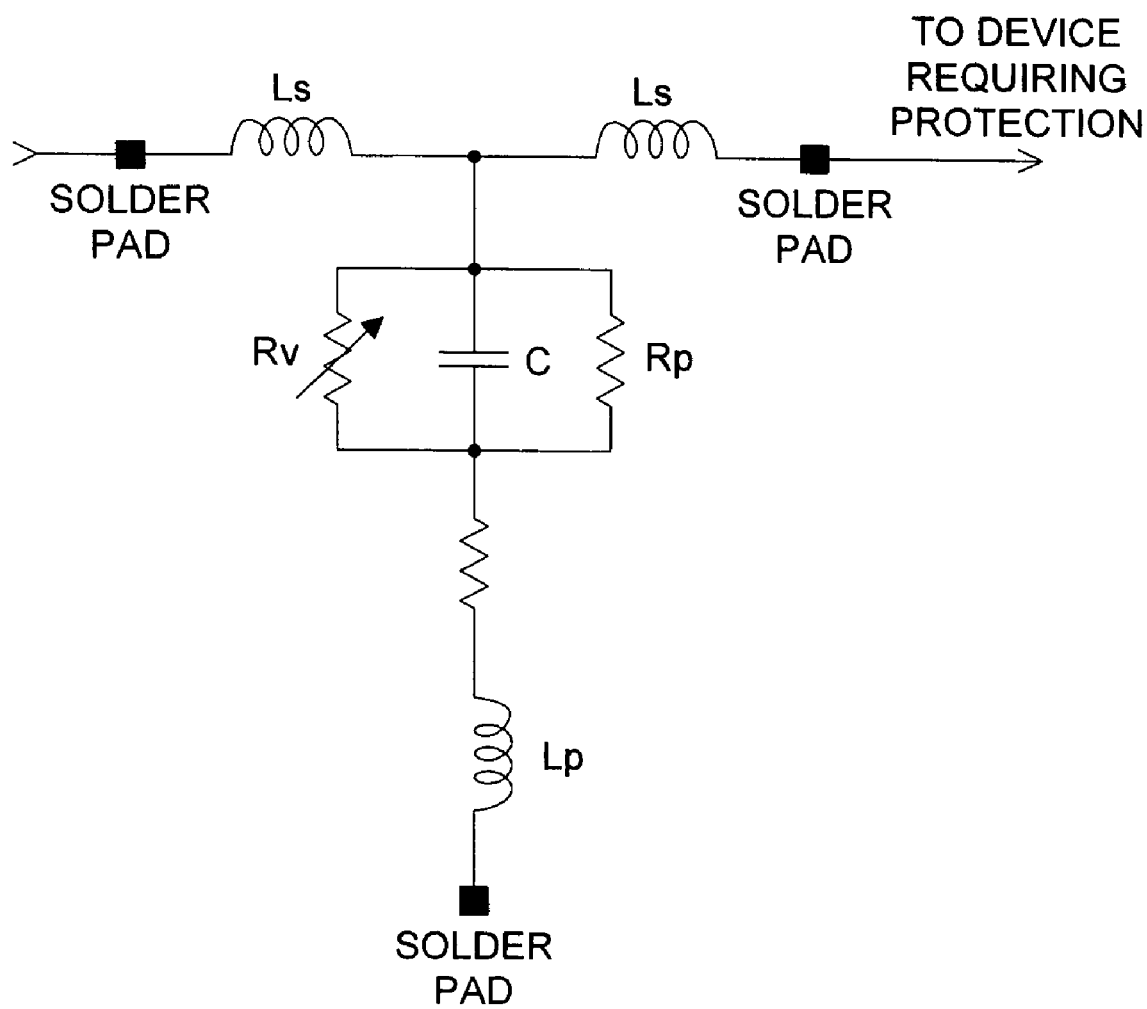
FIG. 3 shows an equivalent circuit of an exemplary filter device used in the arrangement of FIG. 2.

The junction 228 is further connected to a second filter stage, which is in the form of a multilayer varistor feedthrough (MLVF) device 230. The MLVF device 230 is preferably a model VC080514C300 TransFeed device from AVX Corporation. The equivalent circuit of the MLVF device 230 is shown in FIG. 3.

Suitable values for the various element described above are set forth below in Table 2. It will be apparent to those of ordinary skill in the art how to adjust various elements to modify the output levels and behavior of the analog current circuit 212.

TABLE 2

| Device | Value |
|---|---|
| RBURDEN | 3.3 ohm |
| R6 | 2.0 k-ohm |
| R7 | 1.3 k-ohms |
| C7 | 330 pF |

FIG. 3 shows a discrete model 300 of the MLVF device 230 of FIG. 2. Alternative embodiments may implement this or a functionally similar circuit in a manner not related to the MLVF device 230. Referring to FIG. 3, the model 300 includes a pass-through line 302 having series inductors $L_S$ the represent the series body inductance of the device. The model 300 further includes, coupled between the pass-through line 302 and ground, an RC circuit 304, a turn-on resistance $R_{ON}$, and a parallel body inductance $L_P$ coupled in series. The RC circuit 304 includes a voltage variable resistance $R_V$, a capacitor C having a capacitance defined by the voltage rating and energy level of the device, and a parallel body resistance $R_P$.

Figure 4:
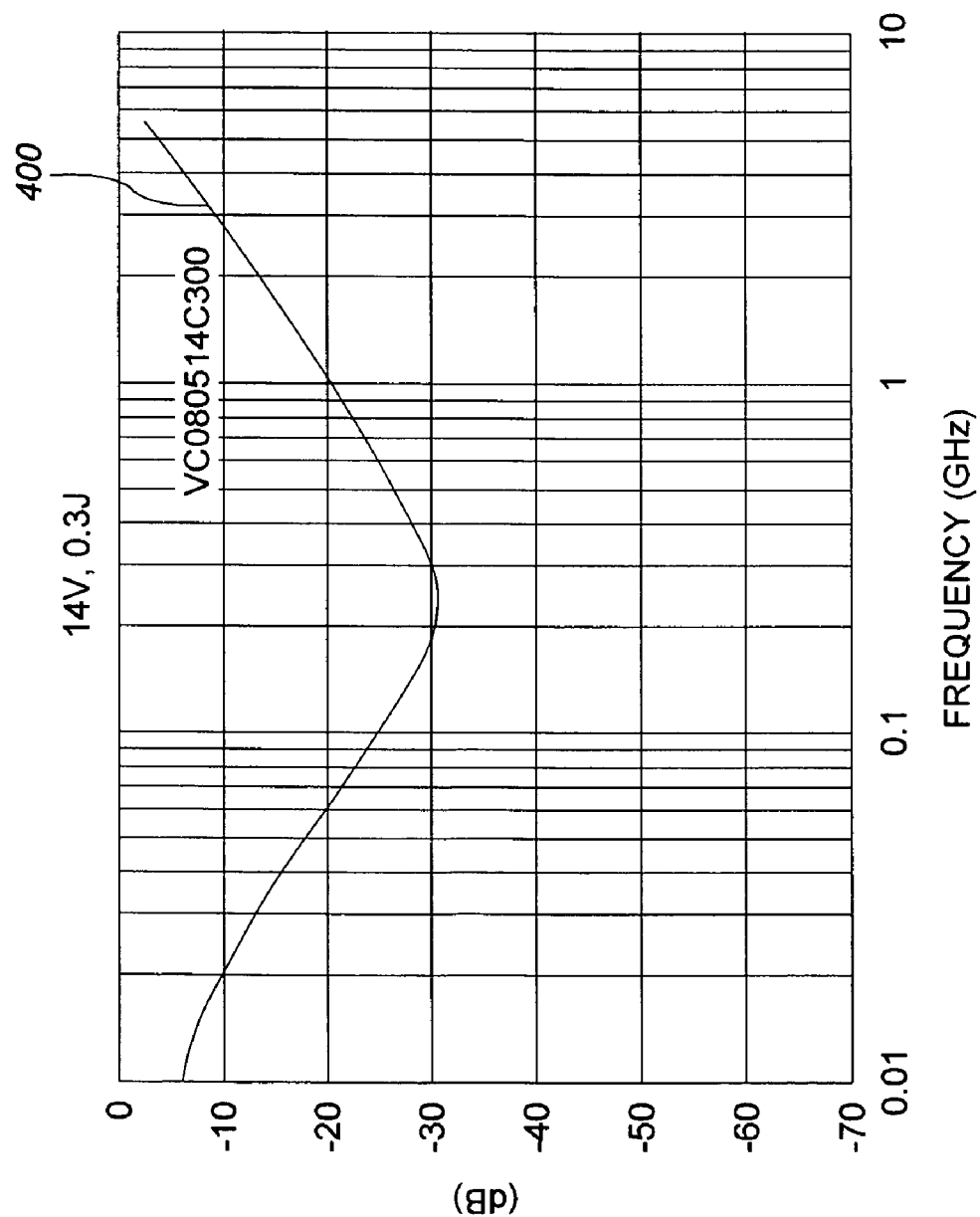
FIG. 4 shows a response curve for the exemplary arrangement of FIG. 2.

The pass-through line 302 of the model 300 represents the connection between the output of the filter formed by R6, R7 and C7 and the input to the IC 222 of FIG. 2. In general, however, the exemplary embodiment of the MLVF device 230 of FIG. 2 (modeled by the model 300 of FIG. 3) has a response curve as shown in FIG. 4. This response curve 400 shows attenuation as a function of frequency, and is particularly associated with the model VC080514C300 TransFeed device from AVX Corporation.

The general operation of the circuit of FIG. 2 is discussed herebelow. Referring generally to FIG. 2, the source 204 generates an AC power line signal on the power line 202, which is intended to be consumed by the load 205 as required by the load 205. If the load 205 is a domestic household, then the load 205 requires varying levels of current based on the combination of appliances, electronic devices, lights and other electricity consuming equipment is in use.

The analog voltage circuit 210 operates to generate an analog voltage measurement signal that is representative of the voltage on the power line 202. In particular, voltage on the AC power line is detected at the voltage divider junction 216. Because the input resistor RIN has a very large resistance compared to the second resistor R5, the voltage at the voltage divider junction 216 constitutes a significantly scaled-down version of the AC power line signal from the power line 202. The voltage signal at the voltage divider junction 216, which is the analog voltage measurement signal, is provided to the IC 222. The IC 222 then samples the voltage measurement signal to generate a digital voltage signal that may be used for various energy calculations.

Contemporaneously, the analog current circuit 212 generates a current measurement signal that is representative of the current waveform on the power line 202. In particular, the current transformer 226 detects current on the power line 226 and generates a corresponding scaled down current signal. Because RBURDEN is much lower than R6 and R7, most of the current generated by the current transformer 226 passes through RBURDEN. As a result, the output of RBURDEN is a signal that has a voltage level proportional to the current detected by the current transformer 226. This output of RBURDEN thus constitutes the raw analog current measurement signal. The raw analog current measurement signal passes through the low pass filter formed by R6, R7 and C7 to remove high frequency noise. However, high frequencies in the range of 100 MHz or more are not well filtered by the low pass filter formed by R6, R7 and C7 because of the limitations of the discrete components.

The filtered analog current measurement signal thereafter propagates throught MLVF device 230. The MLVF device 230 filters by at least 20 dB any frequency content located between 100 MHz and 1 GHz (see FIG. 4). The MLVF device 230 therefore filters out any noise that otherwise passes through the low pass filter formed by R6, R7 and C7. The twice-filtered current measurement signal then propagates to the IC 222. The IC 222 samples the current measurement signal to generate a digital current signal used for various energy calculations.

As discussed above, it is particularly advantageous to filter the analog current measurement signal because of the large variance in the magnitude of the current to be measured, as compared to the variance of the voltage. In particular, the voltage measurement signal will typically always be a standard value (120 Volts AC, 240 Volts AC, etc.) or within a close tolerance of that value. By contrast, the current measurement signal varies directly proportional to the amount of energy used by the load 205. Accordingly, the current measurement signal may be very low at times, particularly if the load is largely inactive. Low current measurements are particularly prone to interference from external sources because the signal to noise ratio is increased. Accordingly, it is advantageous to include the filtering circuits on the analog current circuit 212. Nevertheless, in some embodiments it may be advisable to include one or both filters in the analog voltage circuit 210.

As discussed above, in a multi-phase electrical system, the analog voltage circuit 210 and the analog current circuit 212 is reproduced for each phase of the system being measured.

It will be appreciated that the above described embodiments are merely illustrative, and that those of ordinary skill in the art may readily devise their own implementations and modifications that incorporate the principles of the present invention and fall within the spirit and scope thereof.

I claim:

1. An electricity meter, comprising:
   a scaling unit configured to be coupled to at least one power line, the scaling unit operable to generate analog signals representative of at least one aspect of a power line signal on the power line;

an analog-to-digital (A/D) converter coupled to receive analog signals from the scaling unit and generate digital measurement signals representative of the analog signals;

a processing circuit operable to generate electricity metering information based on the digital measurement signals;

a first filter stage operable to attenuate signals in a first frequency range that is higher than a frequency band of interest of the signal to be measured, the first filter stage operably coupled between the scaling unit and the A/D converter; and a second filter stage operable to attenuate signals in a second frequency range that is higher than the first frequency range, the second filter stage operably coupled between the scaling unit and the A/D converter.

2. The electricity meter of claim 1, wherein first filter stage and the second filter stage are serially connected.

3. The electricity meter of claim 1, wherein the scaling unit is operable to generate the analog signals as a voltage measurement signal and a current measurement signal, and wherein the first filter stage and the second filter stage are operably coupled to perform filtering on the current measurement signal.

4. The electricity meter of claim 1, further comprising a communication circuit operably coupled to the processing circuit, the communication circuit operable to transmit the electricity metering information to a remote location.

5. The electricity meter of claim 4, wherein the communication circuit is operable to generate spread spectrum communication signals.

6. The electricity meter of claim 5, wherein the scaling unit is operable to generate the analog signals as a voltage measurement signal and a current measurement signal, and wherein the first filter stage and the second filter stage are operably coupled to perform filtering on the current measurement signal.

7. The arrangement of claim 1, wherein the second filter stage comprises a multilayer varistor feedthrough device.

* * * * *